United States Patent [19]

Alanko

[11] Patent Number: 5,665,301
[45] Date of Patent: Sep. 9, 1997

[54] APPARATUS AND METHOD FOR FORMING FIBER REINFORCED COMPOSITE ARTICLES

[75] Inventor: John Sulo Matias Alanko, Aurora, Canada

[73] Assignee: Arctek Inc., Aurora, Canada

[21] Appl. No.: 500,590

[22] Filed: Jul. 11, 1995

[51] Int. Cl.$^6$ .................................................. B29C 70/44
[52] U.S. Cl. ...................... 264/571; 264/257; 264/316; 264/314; 425/112; 425/389; 425/405.1; 425/DIG. 44
[58] Field of Search .................... 425/112, 389, 425/390, 405.1, DIG. 44; 264/258, 257, 313, 314, 316, 510, 571

[56] References Cited

U.S. PATENT DOCUMENTS

| | | | |
|---|---|---|---|
| 4,622,091 | 11/1986 | Letterman | 264/258 |
| 4,842,670 | 6/1989 | Callis et al. | 425/DIG. 60 |
| 4,873,044 | 10/1989 | Epel | 425/389 |
| 4,878,979 | 11/1989 | Steinbach | 264/316 |
| 4,942,013 | 7/1990 | Palmer et al. | 264/571 |
| 5,131,834 | 7/1992 | Potter | 425/389 |
| 5,152,949 | 10/1992 | Leoni et al. | 425/389 |
| 5,433,165 | 7/1995 | McGuiness et al. | 264/571 |

FOREIGN PATENT DOCUMENTS

| | | | |
|---|---|---|---|
| 57-18228 | 1/1982 | Japan | 264/257 |

*Primary Examiner*—Robert Davis

[57] ABSTRACT

A unitary vacuum bag for forming of a fiber reinforced composite article, made of a fabric mesh reinforced curable elastomer, having a smooth surface on both sides. The bag is constructed upon the surface of the article which is to be reproduced and upon a planar flange extension of the mold for said article. A rigid vacuum chamber assembly consisting of a planar fiber reinforced composite or equivalent sheet is sealed on the outer periphery to the mold flange extension and on the inner periphery to the top surface of the bag by rubber seals which are attached to the vacuum chamber assembly under surface. A vacuum port through the vacuum chamber assembly between the rubber seals allows vacuum to be applied to the chamber causing it to be pressed by atmospheric pressure to the mold flange extension and bag periphery thus sealing the bag to the mold periphery and simultaneously providing a continuous vacuum source around the entire periphery of the bag. The vacuum is connected to the fiber reinforcement in the mold via multiple self sealing micro porous conduits passing under the bag periphery between the vacuum chamber and the mold cavity containing the fiber reinforcement for the article. The bag is constructed within integral multiple injection ports positioned at strategic locations for introduction of catalysed thermoset resins into the reinforcement. Optionally, a series of tubular air pressure channels are made integral to the bag which, when inflated, cause the bag to distort, resulting in resin flow channels forming under the bag on both sides of the inflated air channel. Deflation of the air channel returns the bag to it's original contour with no trace of the flow channel evident on the surface of the completed article.

8 Claims, 6 Drawing Sheets

APPARATUS AND METHOD FOR FORMING FIBER REINFORCED COMPOSITE ARTICLES

BACKGROUND OF THE INVENTION

This invention relates to a process for producing thermoset resin impregnated fiber reinforced composite articles with a predetermined ammount of resin in order to produce a uniformly resin impregnated structure substantially free of air voids and free of vacuum induced monomer vapour bubbles. The process of vacuum bagging fiber reinforced composites is not new. Traditional methods have relied on, prewetting the fiber reinforcement with catalysed resin and then applying a peel ply or perforated release sheet to the resin impregnated reinforcement to define the inside surface of the article. An absorptive layer was then applied to the peel ply followed by an impervious sheet made from polyvinyl alcohol film or polyethylene film which was sealed to the mold periphery by a suitable tape such as butyl tape to form a sealed envelope. The impervious sheet was then fitted with one or more vacuum connections and a vacuum was applied. This resulted in any excess resin in the resin impregnated fiber composite being drawn through the peel ply and absorbed in the material lying between the peel ply and the impervious sheet. After curing, the impervious sheet with the adhesive was removed, then the absorptive layer and peel ply were removed. All of this was discarded as waste.

In recent years this process was modified. The fiber reinforcement was placed in the mold cavity in it's dry state. The peel ply was next applied followed by a distribution medium or spacer to hold the impervious outer sheet apart from the peel ply. The impervious outer sheet containing fittings for vacuum introduction and/or resin introduction to the distribution medium was applied last and sealed to the mold periphery by conventional sealing tape to form a sealed envelope. A vacuum was applied to the distribution medium and fiber reinforcement via the vacuum fittings or peripheral vacuum channels and the resin was introduced through the fitting(s) in the impervious outer sheet into the distribution medium. The resin was continuously drawn out via the vacuum passages and reintroduced to the resin inlet(s) or discarded until the fiber reinforcement was completely impregnated by the resin. After curing, the peel ply, distribution medium containing cured resin, impervious outer sheet and connecting hoses were discarded. Seemann's Pat. Nos. 4,902,215 and 5,052,906 discribe such a process as do Palmer (U.S. Pat. No. 4,942,013) and Fourcher (U.S. Pat. No. 4,312,819).

These current processes all use single use disposible apparatus to achieve the manufacture of a single article. The control of the manufacturing process with these techniques is very labour intensive and wasteful resulting in poor manufacturing economy. Most fiber reinforced composites use unsaturated polyesters, vinyl esters or epoxies. Unsaturated polyesters and vinyl esters are preferred because of their economy and handling characteristics. These resin systems contain reactive monomers such as styrene as a diluent and for cross linking of the polymer. Monomers such as styrene will boil at reduced atmospheric pressure resulting in the formation of vapour bubbles throughout the resin. This is a common problem when impregnating fiber reinforcements with these vacuum processes since the resin is continually exposed to vacuum until it cures.

Silicones have been used as mold making materials for many decades. Mold making silicones are expensive, generally platinum cured, two component systems that are widely available through all current silicone manufacturers. Herbert, in U.S. Pat. No. 5,087,193 refers to the use of such a silicone in conjunction with multiple layers of 10 oz. glass cloth as a reinforcing material to produce a flexible mold with a thickness of ⅜' to ⅝'. This type of structure poses two problems: The glass reinforcement is not compatable with the elongation characteristics of silicone and will delaminate on repeated flexing, and the thickness of the silicone mold will trap styrene vapour which will subsequently polymerize in the silicone and destroy the flexibility and release properties of the silicone.

Seemann's U.S. Pat. No. 5,316,462 also refers to the use of a similar silicone, Dow Corning Tooling Elastomer -THT for the manufacture of a bag with integral distribution channel network. Seemann mentions the use of unwoven nylon fibers to reinforce the silicone bag if necessary. The thickness of the Seemann bag necessitated by the integral resin channels creates the same problem of internal styrene polymerization and the complexity of the design is prone to tear propagation during removal of cured resin waste and handling, resulting in short bag life. The Seemann silicone bag does nothing to eliminate the excess resin waste or need for a discardable peel ply.

OBJECTS OF THE INVENTION

It is the object of this invention to provide an improved apparatus for the production of high strength void free fiber reinforced resin structures, particularly structures of high complexity.

A further object is to provide an apparatus which simplifies current vacuum bag structures, techniques and reduces labour input over conventional hand lay up, spray up, and vacuum bag methods as are known to the art.

A yet further object is to provide an apparatus which is durable and reusable to enable it's use in a volume production situation and eliminate waste and disposable components from the manufacturing process.

SUMMARY OF THE INVENTION

The apparatus of the invention as shown in FIG. 1, contains a mold surface (1) suitable for producing fiber reinforced articles and having attached an integral planar mold flange (2) for the purpose of sealing the open mesh fabric reinforced elastomeric form fitting bag (3) which has integral sealable resin inlet(s) (9), A separate rigid vacuum clamping assembly (5) with integral vacuum outlet (10) has attached an outer rubber seal (6) which contacts with the outer peripheral top surface of the integral planar mold flange (2) and an inner rubber seal (7) which contacts with the upper peripheral surface of the open mesh reinforced elastomeric form fitting bag (3) defining a peripheral vacuum chamber (8) having rigid vacuum clamping assembly (5) as the top surface, outer rubber seal (6) and inner rubber seal (7) as sides and integral planar mold flange (2) as the bottom surface. The apparatus of this invention in addition to the features (1) to (10) inclusive has a self sealing micro porous transition conduit (11) in fluid communication with the peripheral vacuum chamber (8) and the fiber reinforcement bundle (4) between the mold surface (1) and the open mesh reinforced elastomeric form fitting bag (3). A further apparatus of this invention is the air lifter tube (12) with air inlet (13) integral with the upper surface of the open mesh fabric reinforced elastomeric form fitting bag (3).

The dry fiber reinforcement bundle (4) is applied to the mold surface (1) followed by the placement of the open mesh fabric reinforced elastomeric form fitting bag (3). The self sealing micro porous transition conduits (11) are placed strategically around the mold surface (1) periphery in contact with the fiber reinforcement bundle (4) to be at the terminus of the resin flow through the fiber reinforcement bundle (4) and to be in fluid communication with the fiber reinforcement bundle (4) and the peripheral vacuum chamber (8). The vacuum clamping assembly (5) is placed on top of the integral planar mold flange (2) so that the outer rubber seal (7) contacts intimately with the outer periphery of mold flange (2) and the inner rubber seal (6) contacts intimately with the peripheral top surface of the open mesh fabric reinforced elastomeric form fitting bag (3). Resin inlet port (9) is then closed. Vacuum is applied to the integral vacuum outlet (10) on the vacuum clamping assembly (5) and the resultant atmospheric pressure on the vacuum clamping assembly (5) presses outer rubber seal (7) tight to mold flange (2) and inner rubber seal (6) tight to the peripheral top surface of the open mesh fabric reinforced elastomeric form fitting bag (3) which then presses tight the bottom surface of the open mesh fabric reinforced elastomeric form fitting bag (3) to the inner surface of integral planar mold flange (2). The self sealing micro porous transition conduit (11) now allows air and volatile components to be drawn through into the peripheral vacuum chamber (8) from the fiber reinforcement bundle (4) and exhausted through the vacuum pump (not shown for clarity). The resultant drop in pressure between the mold surface (1) and the open mesh fabric reinforced elastomeric form fitting bag (3) causes the open mesh fabric reinforced elastomeric form fitting bag (3) to be pressed tight to the fiber reinforcement bundle (4) on the mold surface (1) and serves to shape and compact the fiber reinforcement bundle (4) to the mold surface (1). The air lifter chambers (15) are inflated to 5 to 10 pounds per square inch air pressure through air inlet fittings (13) causing the air chamber (15) to change shape from a flat configuration as shown in FIG. 4 to a tubular configuration as shown in FIG. 5 thereby distorting the open mesh fabric reinforced elastomeric form fitting bag (3) and creating resin distribution channels (14). A predetermined volume of catalysed thermoset resin is pumped rapidly under pressure into the fiber reinforcement bundle (4) through integral sealable resin inlet (9) on the open mesh fabric reinforced elastomeric form fitting bag (3) and then the integral sealable resin inlet (9) is closed. The rapid injection of resin under pressure causes the open mesh fabric reinforced elastomeric form fitting bag (3) to lift to accommodate the volume of resin accumulating between it and the mold surface (1) resulting in rapid movement of the resin over and through the fiber reinforcement (4) aided by the resin distribution channels (14). The resin flow moves toward the the self sealing micro porous transition conduits (11) allowing any residual air or volatiles remaining in the dry fiber reinforcement bundle (4), due to imperfect vacuum, to be drawn out through the self sealing micro porous transition conduits (11) into the peripheral vacuum chamber (8) and exhausted through the vacuum pump. The air pressure in the air lifter chambers (15) is then released, prior to resin gellation, and the air lifter (12) returns to it's original flat configuration leaving no trace of the resin distribution channel (14) on the cured article. The resin enters the self sealing micro porous transition conduits (11) causing the monomer soluable component contained in the self sealing micro porous conduit (11) to swell and seal off the conduit to resin flow. Vacuum is maintained on the rigid vacuum clamping assembly (5) while the resin is allowed to cure. The rigid vacuum clamping assembly (5) is then removed, followed by the removal of the open mesh fabric reinforced elastomeric form fitting bag (3) and the completed article is finally removed. The open mesh fabric reinforced elastomeric form fitting bag (3) requires no clean up and is immediately ready for reuse. The self sealing micro porous transition conduits (11) act as lifting tabs to aid in removal of the article from the mold surface (1). The smooth mold surface (1) is free of channels or passages required by other techniques, eliminating labour intensive mold clean up.

BRIEF DESCRIPTION OF THE DRAWINGS

Total of 6 (six) drawings

DETAILED DESCRIPTION OF THE INVENTION

Figure 1:
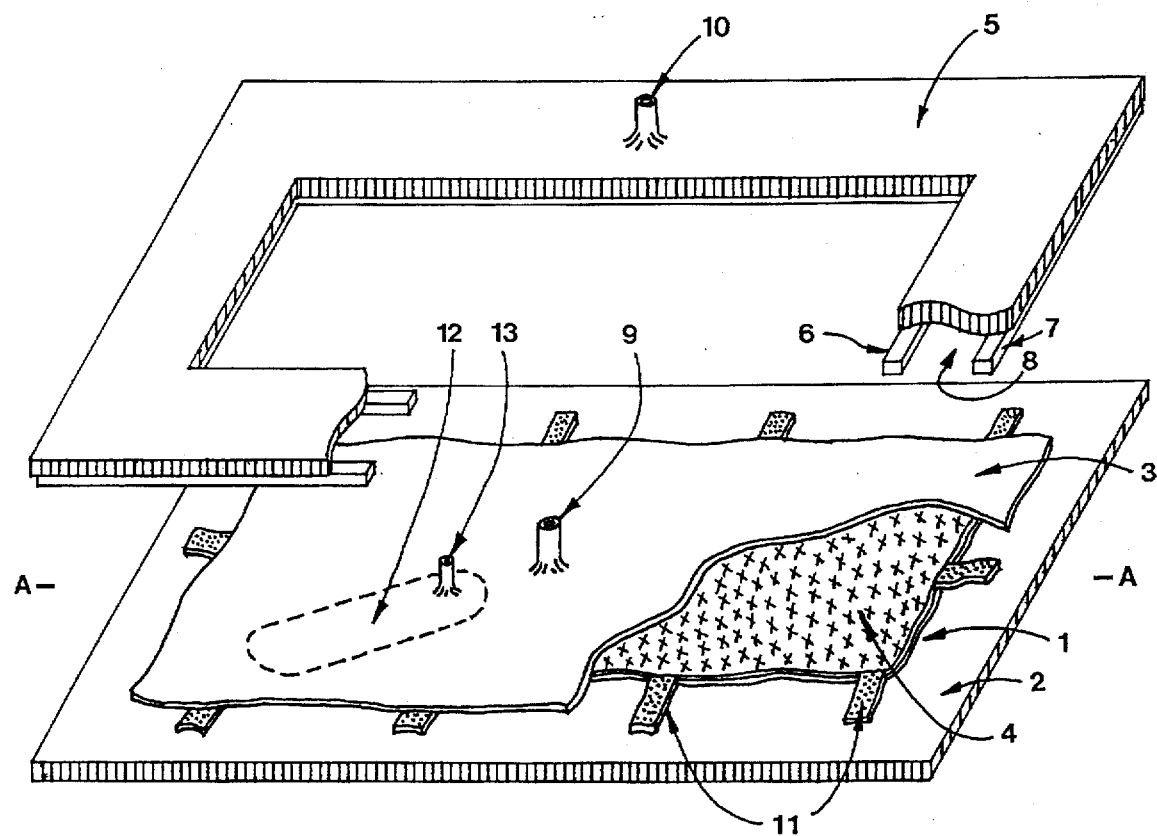
FIG. 1 shows a plan view of a molding assembly with the vacuum clamping assembly in a raised position and cut away to show the rubber seals. The planar mold surface has an extended flange which dimensionally exactly matches the vacuum clamping assembly. The fiber reinforcement is shown in contact with the mold surface and the open mesh fabric reinforced elastomeric form fitting bag, with integral air lifter tube, situated on top of the reinforcement. The self sealing micro porous transition conduits are shown in position extending from the fiber reinforcement under the bag and into the vacuum chamber.
Figure 2:
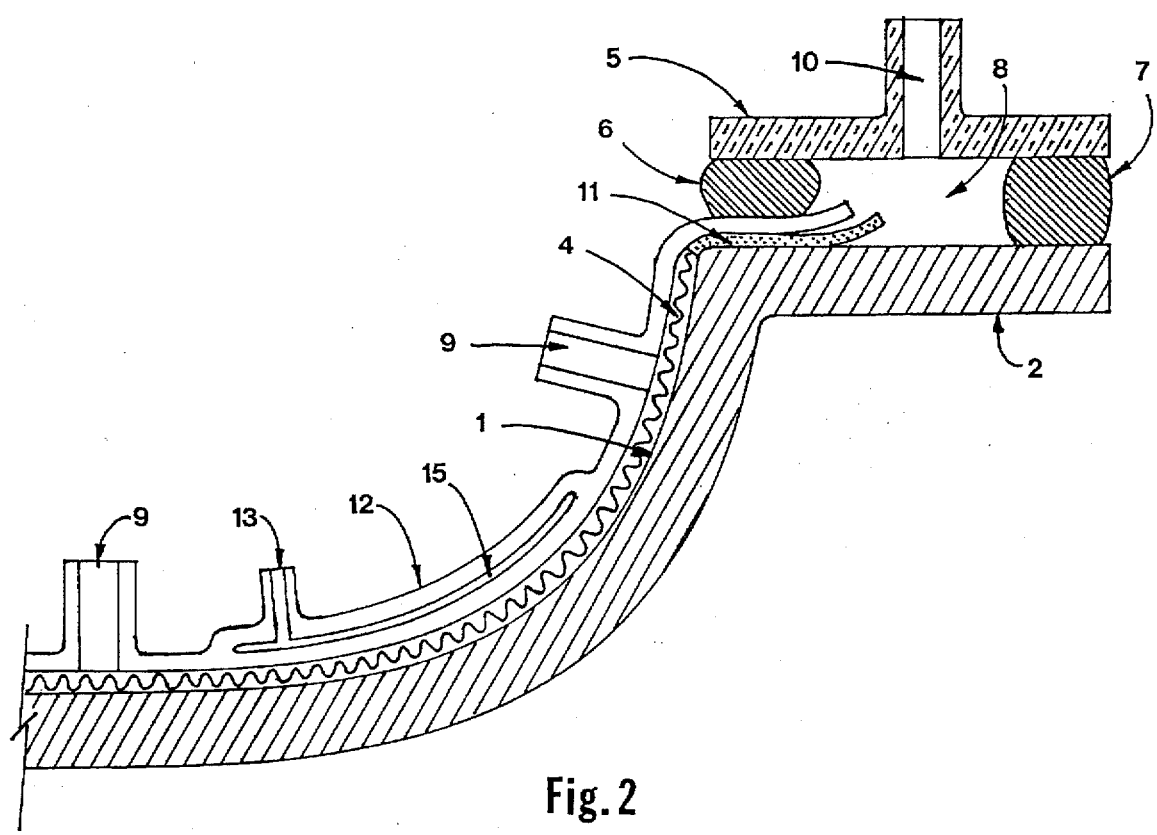
FIG. 2 is a cross sectional view of the invention depicting a boat hull (half) with the open mesh reinforced elastomeric form fitting bag in position and with vacuum applied in readiness for resin injection. Also shown is a longitudinal cross section of an air lifter in it's deflated state and the self sealing micro porous transition conduit in position. An alternate or multiport configuration is indicated by the dual resin inlets.
Figure 3:
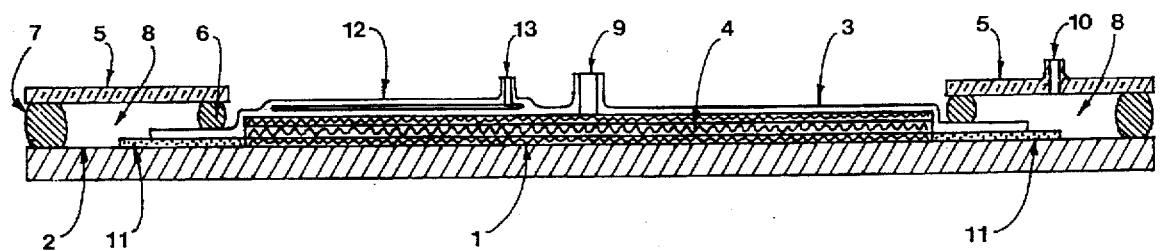
FIG. 3 is a cross section A—A of FIG. 1 in the assembled state.

Referring to FIG. 1 , the simplicity of the invention is readily apparent. Tapes or other adhesives are not required to seal the open mesh fabric reinforced elastomeric form fitting bag (3) to the peripheral integral planar mold flange (2) as this is accomplished by atmospheric pressure acting on the rigid vacuum clamping assembly (5) through the inner rubber seal (6). The conformability of the bag elastomer in contact with the integral planar mold flange (2) inner periphery creates a perfect seal. The width of the rigid vacuum clamping assembly (5) between the inner rubber seal (6) and outer rubber seal (7) determines the pressure exerted by these seals onto the integral planar mold flange (2). Typically a distance between the seals is 4 inches to 6 inches providing adequate pressure to prevent loss of vacuum of resin seepage from under the bag. The rubber seals (6) and (7) are typically closed cell neoprene foam but can be of any rubber like material impervious to air flow. A feature of the rubber seals (6) and (7) is that they do not come into contact with the resin used for manufacturing the article and therefore need not be chemically resistant. The rubber seals (6) and (7) require no cleaning or maintenance whatsoever. Another feature of the rigid vacuum clamping assembly (5) is that it is separate from the open mesh fabric reinforced elastomeric form fitting bag (3). This feature makes it possible to adjust the fiber reinforcement bundle (4) position if necessary by partly lifting or folding back the open mesh fabric reinforced elastomeric form fitting bag (3) without the necessity of removing the rigid vacuum clamping assembly (5) completely. This is particularly useful on large and complex articles. Adjusting fiber reinforcement bundle (4) position before resin injection is a considerable endeavor using the tape secured bag and peel ply arrangement as suggested in Seemann's U.S. Pat. Nos. 4,902,215 and 5,052,906 and 5,316,462. and is in general difficult with mechanically clamped bag systems or systems where the bag is integral with the clamping assembly as suggested by Hicks U.S. Pat. No. 2,441,097. Clamping systems with integral bag pose further difficulty in that they do not allow easy access to facilitate gentle manipulation of the bag during removal of the bag from a geometrically complex article.

The integral planar mold flange (2) typically is 6 to 8 inches in width and surrounds the periphery of the mold surface (1) and is integral with the mold surface (1) being an extension of it. The mold cavity is defined as that portion of the mold surface (1) containing the fiber reinforcement bundle (4). The integral planar mold flange (2) is typically adjacent to the mold surface (1) periphery when this is practical but can be further extended to provide a trimming edge or facilitate making the integral planar mold flange (2) as planar as possible. The preferred orientation of the integral planar mold flange (2) is horizontal but it can be positioned at any angle to facilitate access to the mold surface (1) for loading of the fiber reinforcement bundle (4). The construction of the mold and mold flange extension are in agreement with mold making practices for common hand lay-up type molds as are well known to the art.

The self sealing micro porous transition conduit (11) is placed in contact with the fiber reinforcement bundle (4) on the mold surface (1) and extends under the peripheral edge of the open mesh fabric reinforced elastomeric form fitting bag (3) and into the peripheral vacuum chamber (8). The vacuum drawn on the peripheral vacuum chamber (8) causes air and volatiles to pass from the fiber reinforcement bundle (4), through the self sealing micro porous transition conduit (11) and into the peripheral vacuum chamber (8) from which it is subsequently removed through integral vacuum outlet (10) via the vacuum pump (not shown). The self sealing micro porous transition conduit (11) is constructed of a fibrous veil like supporting sheet, usually a polyester veil as is available from Sterling Paper Company, Seymour, Conn. USA. and is coated with micro balloons of styrene soluable nature such as Miralite Saran Microspheres available from Pierce and Stevens Co. Fort Erie, USA. The resulting structure allows the passage of air and volatiles between the microspheres but on contact with monomer from the resin trying to pass from the fiber reinforcement bundle (4) to the peripheral vacuum chamber (8), the microballoons absorb and expand with the monomer contained in the resin, effectively sealing the conduit. The width and thickness of the self sealing micro porous conduit (11) is selected according to the desired speed of evacuation of the fiber reinforcement bundle (4) in the mold cavity. Generally a thickness off 2 to 4 mm. and a width of 2 to 8 cm. works well. A number of self sealing micro porous transition conduits (11) can be placed around the mold cavity to ensure rapid and total evacuation of the fiber reinforcement bundle (4). In the preferred embodiment, the self sealing microporous transition conduits (11) are ideally placed at the outermost extremities of the article coinciding with the completion of saturation of the fiber reinforcement bundle (4) and thereby ensuring complete removal of residual air from the fiber reinforcement bundle (4) prior to resin saturation. At the instant when all of the self sealing micro porous conduits have been sealed, the fiber reinforcement bundle (4) in the mold cavity will be separated from the peripheral vacuum chamber (8) and vacuum by the sealed micro porous conduit (11). Any dry areas of fiber reinforcement (4) remaining within the mold cavity will still maintain existing vacuum and continue to fill with resin which is already captive in the mold cavity resulting in a void free article. The separation of the mold cavity from the vacuum source at the termination point of resin saturation is significant as it prevents the overflow of resin from the mold cavity. The resin in the mold cavity is subject to flow depending on the differential pressures in various areas inside the mold cavity. Generally, the area surrounding the resin inlet port (9) will have the highest (resin) pressure, and areas near the flow terminus at the outer periphery of the mold cavity will have the lowest relative pressure. The resin will continue to flow until the pressure inside the mold cavity has balanced, resulting in a uniform reinforcement to resin ratio throughout the article. The volume of resin can be chosen such that the final balanced pressure inside the mold cavity is above the pressure at which the monomer in the resin system will develop vapour bubbles (boil) and thus monomer vapour boil bubbles are avoided.

The open mesh fabric reinforced elastomeric form fitting bag (3) is fitted with one or more integral sealable resin inlets (9) depending on the size of the article to be formed and the configuration and complexity of the article. The integral sealable resin inlet (9) are sealed by any convenient means such as pinch clamps or valves. In the preferred embodiment a polyethylene tube, of the exact diameter of the integral sealable resin inlet, is secured to the port by a hose clamp and a pinch type clamp is used on the polyethylene tubing to effect the opening and sealing of the resin inlet port. During the manufacture of articles with bags containing more than one integral sealable resin inlet, resin can be injected in all inlets simultaneously or in a sequential fashion.

The air lifter tube (12) is located in close proximity to the integral sealable resin inlet (9) to transport the injected resin quickly away from the integral sealable resin inlet (9) to other areas of the fiber reinforcement bundle (4) without the need for multiple resin inlet ports. This is particularly useful when the fiber reinforcement bundle (4) is of very dense construction. The number and length of the air lifter tubes (12) is not restricted nor is the number of integral sealable resin inlets (9) used in cooperation with the air lifter tubes (12).

Figure 4:
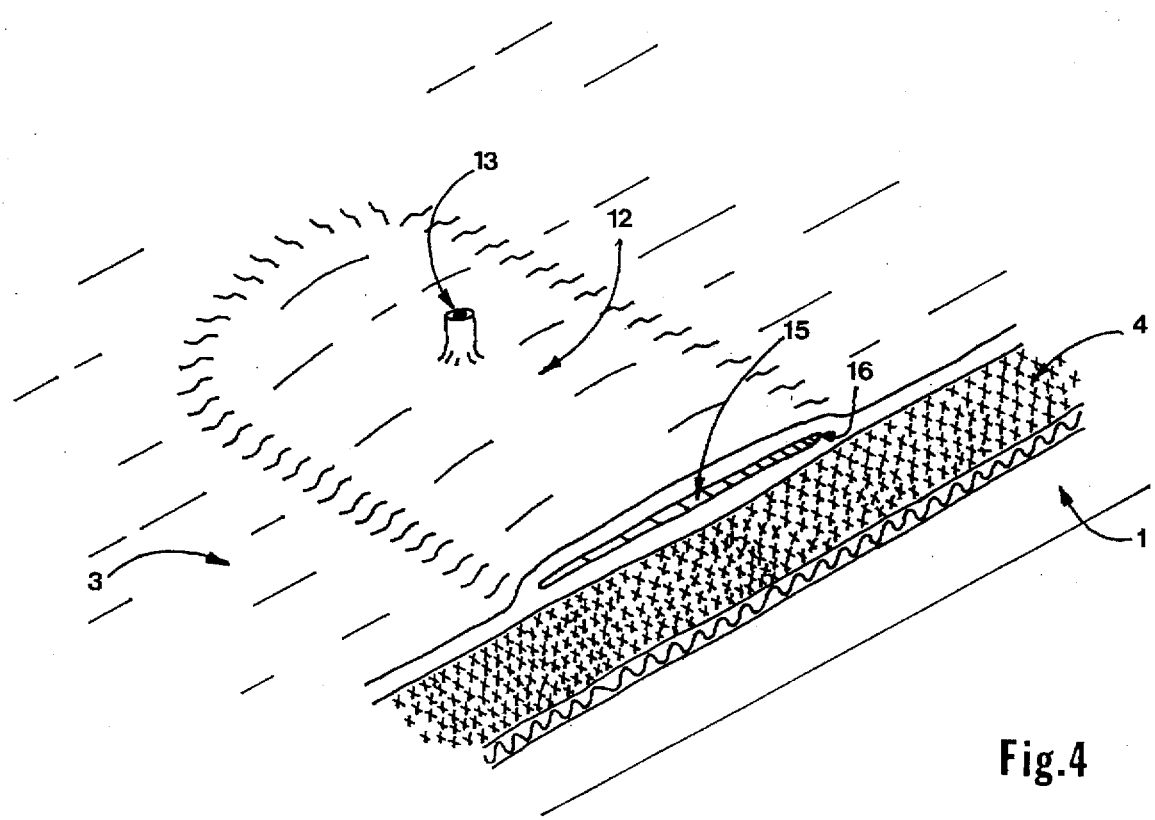
FIG. 4 shows a pictorial sectional view of a deflated air lifter.

Referring now to FIG. 4, the air lifter tube (12) is shown in a deflated state with the air inlet (13) open to atmospheric pressure. The air lifter tube (12) air chamber (15) is a flattened shape with the top surface of the air lifter tube (12) parallel with the surface of the open mesh reinforced elastomeric form fitting bag (3) and becoming integral with the open mesh fabric reinforced elastomeric form fitting bag (3) at point (16).

Figure 5:
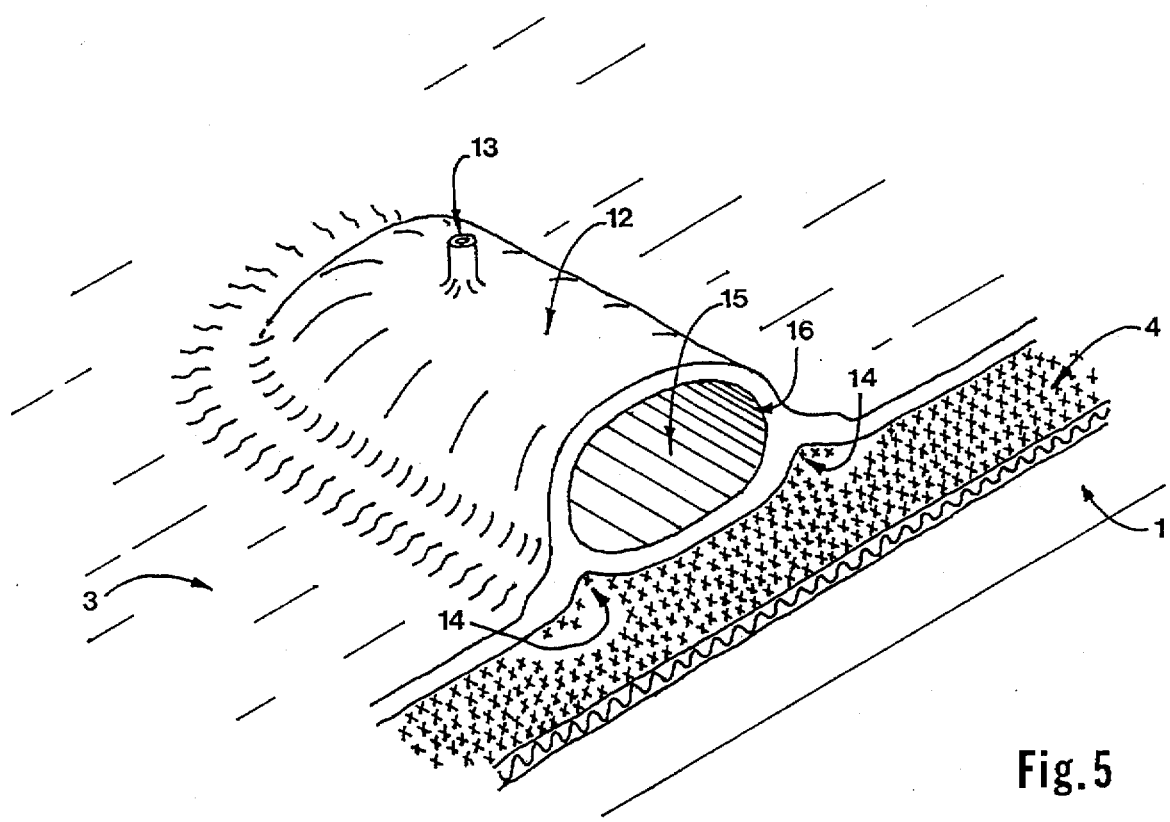
FIG. 5 shows a pictorial view of the air lifter in FIG. 4 in the inflated state

Referring now to FIG. 5, air pressure is introduced into air inlet (13) and begins to expand air lifter chamber (15), changing the cross section of the air lifter tube (12) from flat to circular. The points (16) begin to rise away from the fiber reinforcement bundle (4) as the air lifter tube (12) rises, creating resin distribution channel (14) along both sides along the entire length of the air lifter tube (12). The air lifter tube (12) is integral with the open mesh fabric reinforced elastomeric form fitting bag (3) at the outer edges (16) and thus lifts the open mesh fabric reinforced elastomeric form fitting bag (3) away from the fiber reinforcement bundle (4) creating resin distribution channel (14). The resin injected into integral sealable resin inlet (9) flows along resin distribution channel (14) and both laterally and downwardly into the fiber reinforcement bundle (4). The number, length, direction and location of the air lifter tubes (12) is determined by the size, configuration, and required time for completion of resin saturation of the article. When the resin flow is substantially complete in the fiber reinforcement bundle (4), the air pressure to air inlet port (13) is released and the air lifter tube (12) returns to it's flattened shape as in FIG. 4 resulting in collapse of resin distribution channels (14) and the return of the open mesh fabric reinforced elastomeric form fitting bag (3) to it's original flat smooth shape with no trace of the resin distribution channel (14) lower remaining on the surface of the completed article.

Figure 6:
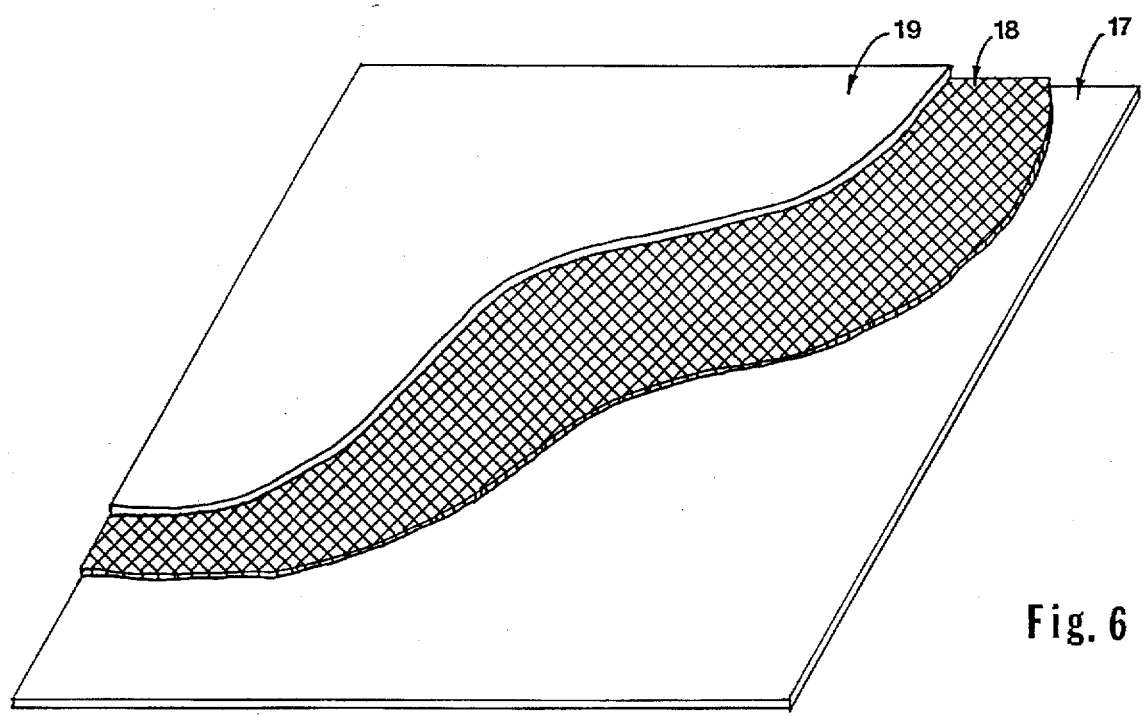
FIG. 6 shows a pictorial cut away view of the bag indicating the construction of the bag and location of the open mesh fabric reinforcement.

Referring now to FIG. 6. A suitable silicone release agent such as a soap solution is applied to the surface of the article from which the bag is to be made and to the integral planar mold flange (2) to prevent the silicone from sticking to the article or integral planar mold flange (2). The open mesh fabric reinforced elastomeric form fitting bag (3) is constructed by first applying by brush to a total thickness of one millimeter, several layers of translucent moisture cured silicone (17) such as Proflex II silicone, manufactured by ARCTEK INC. Proflex II is a single component silicone which cures in thin section in about one hour, allowing for very rapid and economical bag manufacture. An open mesh fabric (18) knitted from synthetic fiber such as polyester fiber, having the characteristic of being stretchy in all planar directions, and having a mesh opening size of about three millimeters and a cord thickness of 0.5 to 1.0 millimeter is next applied to the cured silicone layer (17) surface. The elasticity of the fabric permits the distortion of the bag enabling the formation of the resin flow channels (14). This is not possible using bidirectional woven glass reinforcement as suggested by Herbert in U.S. Pat. No. 5,087,193. The open mesh fabric is impregnated with translucent moisture cured silicone to exclude all air voids and bond it to the lower silicone layer (17). A further one millimeter thickness of the moisture cured silicone (19) is applied by brush in thin layers to a completed bag (3) thickness of three to four millimeters. The 3 mm to 4 mm thickness of the open mesh fabric reinforced elastomeric form fitting bag (3) allows reactive monomer vapour to pass through the silicone bag without being trapped, preventing bag deterioration due to monomer polymerization within the silicone structure. Monomer polymerization will occurr in necessarily thicker silicone bag structures containing integral distribution channels as suggested by Seemann in U.S. Pat. No. 5,316,462. The 3 mm size of the fabric mesh openings provides for a mechanical lock between the lower silicone layer (17) and the upper silicone layer (18) effectively preventing tearing or delamination of the bag. The open mesh fabric reinforced elastomeric form fitting bag (3) must cover the entire article and extend peripherally to a point on the integral planar mold flange (2) between the inner rubber seal (6) and the outer rubber seal (7) but must not extend past the outer rubber seal (7). Integral sealable resin inlets (9) are constructed using tile same technique as just described and are attached to the open mesh fabric reinforced elastomeric form fitting bag (3) in appropriate locations using the moisture cured silicone. The air lifter tubes (12) are similarly fabricated and attached in accordance to resin flow requirements in appropriate locations on the open mesh fabric reinforced elastomeric form fitting bag (3). This invention provides a conformably built vacuum bag which allows for the economical rapid manufacture of fiber reinforced articles having smooth wrinkle free surfaces.

Referring now to FIG. 1. The rigid vacuum clamping assembly (5) is constructed from metal or fiber reinforced polyester to exactly match the opposing surface defined by the integral planar mold flange (2) and with a strength and rigidity sufficient to prevent collapse under atmospheric pressure. The inner rubber seal (6) and outer rubber seal (7) can be of any suitable cross sectional shape which will provide an uninterrupted contact surface with the integral planar mold flange (2) and the peripheral outer surface of the open mesh fabric reinforced elastomeric form fitting bag (3). Typically a square or "D" shaped cross section with a height of 2 cm. to 4 cm. works well. The inner rubber seal (6) and outer rubber seal (7) are fixed to the peripheral lower surfaces of rigid vacuum clamping assembly (5) by a suitable adhesive such as contact cement, creating concentric closed loops which define the peripheral vacuum chamber (8). A suitable integral vacuum outlet (10) is attached to tho vacuum clamping assembly in any location between the inner rubber seal (6) and the outer rubber seal (7) providing fluid communication between the peripheral vacuum chamber (8) and the source of vacuum.

Numerous modifications and adaptions of the present invention will be apparent to those skilled in the art and, thus, it is intended by the following claims to cover all modifications and adaptions which fall within the true spirit and scope of the present invention.

I claim:

1. An apparatus for manufacturing a fiber reinforced polymer article comprising of:

a contact mold with a periphery and an inner surface defining the shape of the outer surface of the article to be molded, a peripheral integral mold flange on the contact mold periphery such that the mold periphery is extended in a continuous relatively planar configuration, an impervious flexible silicone bag mold defining the shape of the inner surface of the article to be molded and containing means for introducing liquid polymer through the bag into the dry reinforcement of the article to be molded, a clamping assembly to provide a means of sealing the silicone bag peripherally to the mold flange having a rigid planar shell with inner and outer seals which contact the contact mold flange to create a vacuum chamber around the periphery of the article to be molded, a self sealing microporous conduit in fluid communication with the peripheral vacuum chamber and the reinforcement of the article to be molded for the purpose of evacuating the mold cavity defined by the contact mold surface and the silicone bag inner surface.

2. The apparatus of claim 1 wherein the contact mold inner surface defines the outer surface of the article to be molded such that:

the contact mold surface is extended past the peripheral edge defining the article to be molded to the substantially planar mold flange, the contact mold surface defines more than one article to be molded in sequence or at one time where the mold surfaces of the articles to be molded are integrally linked by an extended contact mold surface within one mold flange extension peripheral to the mold surface defining the multiple articles.

3. The apparatus of claim 1 wherein the contact mold has an added peripheral mold flange such that:

the mold flange is integral to the contact mold surface periphery, the mold flange is at least 10 centimeters wide past the periphery of article to be molded, the mold flange is substantially planar, the mold flange is continuous around the contact mold periphery, the mold flange is made from the same material as the mold, the mold flange is made from materials different from the mold materials.

4. The apparatus of claim 1 wherein the impervious flexible silicone bag is constructed such that:

the bag is made from the inside surface of an existing article to be molded and accurately defines the inner surface without regard for the thickness or composition of the article to be molded, the bag is made to extend beyond the article periphery onto the mold flange for the purpose of sealing to the mold flange, the bag is made from multiple layers of liquid silicone elastomer applied in singular fashion to a total bag thickness of three to four millimeters, the bag contains an open mesh stretchable fabric reinforcement embedded midway between the inner and outer surfaces of the bag, the bag contains one or more sealable ports which allow liquid polymer to be introduced into the dry reinforcement of the article to be molded.

5. The apparatus of claim 1 wherein the impervious flexible silicone bag includes a means for temporarily distorting the bag to create liquid polymer flow channels within the mold cavity defined by the contact mold surface and the bag inner surface comprising:

an integral fluid inflatable chamber with means for sealing engagement to a fluid pressure source, an integral fluid inflatable chamber which is integral with the surface of the bag, an integral fluid inflatable chamber which does not affect the inner surface shape of the bag when in a non inflated state, an integral fluid inflatable chamber which is peripherally attached to the bag surface such that inflation of the chamber causes the chamber to rise and in doing so, distorts the bag to create liquid polymer flow channels beneath the bag.

6. The apparatus of claim 1 wherein the clamping assembly further comprises:

a rigid or semi rigid cover matching the contact mold flange configuration, an inner rubber seal integral with the inner periphery of the clamping assembly cover and extending continuously around the inner periphery bottom surface for sealing engagement with the vacuum bag periphery, an outer rubber seal integral with the outer periphery of the clamping assembly cover and extending continuously around the outer periphery bottom surface for sealing engagement with the mold flange outer periphery contact surface, a means for connecting the vacuum chamber defined by the clamping assembly cover, inner seal, outer seal, and mold flange to a vacuum source.

7. The apparatus of claim 1 wherein the microporous transition conduit is constructed such that:

the conduit is in fluid communication between the fibrous reinforcement of the article being molded and the vacuum chamber defined by the clamping assembly cover, inner seal, outer seal and the mold flange, the conduit is interposed between the silicone bag periphery and the mold flange at the article periphery, the conduit is composed of a fibrous carrier fabric supporting monomer soluable spheres which will allow air to pass between them but will swell in the presence of monomer thereby sealing the passages between the spheres and preventing monomer containing resins from passing through.

8. A method for manufacturing a fiber reinforced composite article having an outer surface and including fiber reinforced polymer and a core structure embedded in the fiber reinforced polymer so that the fiber reinforced polymer and core structure define the inner surface of the article to be formed, said method comprising the steps of providing a female contact mold with a periphery, a peripheral flange and an inner surface having the shape of the outer surface of the article to be formed, coating said mold inner surface with a release agent and a gelcoat, placing dry reinforcement material on said gelcoat on the mold inner surface, placing a core structure on said dry reinforcement, placing additional dry reinforcement on said core structure, providing a flexible male vacuum bag mold with a periphery, a peripheral flange and an inner surface having the shape of the article inner surface, said bag being provided by forming in said mold an article having a relatively smooth inner surface, applying a silicone release agent to said article inner surface, spreading a plurality of layers of liquid silicone rubber on said mold inner surface release agent, providing a layer of reinforcing material between two layers of said silicone rubber, and allowing said silicone rubber to cure between layers, placing said male vacuum bag mold over said dry reinforcement material to define a space between said male mold and said female mold, sealing said peripheries of said male vacuum bag mold and said female mold by forming a plenum between said peripheral flanges, said plenum forming step including the step of providing inner and outer endless seals at said peripheral flanges such that said plenum is defined between said seals, providing a self sealing microporous conduit between said male vacuum bag mold and said female mold and beneath said inner seal to facilitate air flow from the reinforcement of the article to be formed to said plenum, reducing the pressure in said space between said male mold and said female mold by reducing the pressure in said plenum, injecting resin into said space and curing said resin.

* * * * *